(12) United States Patent
White

(10) Patent No.: US 7,506,940 B2
(45) Date of Patent: Mar. 24, 2009

(54) AXLE SPINDLE AND WHEEL END ASSEMBLY

(75) Inventor: Jay D White, Massillon, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 79 days.

(21) Appl. No.: 11/468,110

(22) Filed: Aug. 29, 2006

(65) Prior Publication Data

US 2007/0052282 A1   Mar. 8, 2007

Related U.S. Application Data

(60) Provisional application No. 60/713,887, filed on Sep. 2, 2005, provisional application No. 60/713,888, filed on Sep. 2, 2005.

(51) Int. Cl.
*B60B 27/00*   (2006.01)
(52) U.S. Cl. ............ 301/105.1; 301/124.1; 384/544
(58) Field of Classification Search ............ 301/105.1, 301/124.1, 131, 132; 384/544
See application file for complete search history.

(56) References Cited

U.S. PATENT DOCUMENTS

| | | | | | |
|---|---|---|---|---|---|
| 2,622,934 | A | * | 12/1952 | Phelps | 301/105.1 |
| 2,634,169 | A | * | 4/1953 | Martin | 301/132 |
| 2,956,632 | A | * | 10/1960 | Forbush et al. | 180/385 |
| 3,453,720 | A | * | 7/1969 | Gerard | 228/144 |
| 4,121,871 | A | * | 10/1978 | Adams, Jr. | 301/105.1 |
| 4,986,608 | A | * | 1/1991 | Fett | 301/124.1 |
| 5,052,979 | A | * | 10/1991 | Welschof et al. | 464/140 |
| 5,090,778 | A | | 2/1992 | Laudszun et al. | |
| RE34,822 | E | * | 1/1995 | Mattson | 180/11 |

(Continued)

FOREIGN PATENT DOCUMENTS

DE   19827073 A1   1/2000

(Continued)

OTHER PUBLICATIONS

Meritor Heavy Vehicle Systems, LLC, DaytonLite™ Hubs brochure, Apr. 2000.

(Continued)

*Primary Examiner*—Russell D Stormer
(74) *Attorney, Agent, or Firm*—Krugliak, Wilkins, Griffiths & Dougherty Co., L.P.A.; David P. Dureska; Edward T. Kennedy

(57) ABSTRACT

An axle for a heavy-duty vehicle extends transversely across the vehicle and includes a central portion. Each one of a pail of relatively short and lightweight axle spindles is connected to and extends outboardly from a respective end of the axle central portion. A wheel end assembly is rotatably mounted on each axle spindle. Each wheel end assembly includes spaced-apart inboard and outboard beatings that are immovably mounted on a respective axle spindle, and the bearings preferably ate standard heavy-duty vehicle stock-type bearings that have respective inner diameters that are generally the same size. The assembly optionally includes a bearing spacer having improved length tolerance. A relatively short and lightweight wheel hub is rotatably mounted on the bearings so that the wheel end assembly selectively accommodates a dual-wheel, standard-tire configuration and a single-wheel, wide-tire configuration, including a two-inch offset wheel.

13 Claims, 6 Drawing Sheets

U.S. PATENT DOCUMENTS

| | | | |
|---|---|---|---|
| D381,615 S | 7/1997 | Smith et al. | |
| 5,757,084 A | 5/1998 | Wagner | |
| 5,795,037 A | 8/1998 | Hagelthorn | |
| 5,997,103 A | 12/1999 | Wagner | |
| 6,149,244 A | 11/2000 | Wagner | |
| 6,491,440 B1 * | 12/2002 | Sahashi et al. | 384/544 |
| D470,447 S | 2/2003 | Orey | |
| 6,533,363 B1 | 3/2003 | Hayes et al. | |
| 6,729,769 B2 * | 5/2004 | Sahashi et al. | 384/537 |
| 6,935,788 B2 * | 8/2005 | Stanczak | 384/551 |

FOREIGN PATENT DOCUMENTS

| | | |
|---|---|---|
| DE | 20121339 U1 | 8/2002 |

OTHER PUBLICATIONS

Hendrickson Trailer Suspension Systems, Wheel-End Options brochure, Jul. 2000.

Hendrickson Trailer Suspension Systems, Wheel-End Hendrickson Unitized System (HUS™) brochure, Nov. 2001.

Meritor Heavy Vehicle Systems, Long-Life Trailer Wheel-End Systems brochure, Mar. 2002.

Hendrickson Trailer Suspension Systems, Vantraax® brochure, Mar. 2004.

Hendrickson Trailer Suspension Systems, Wheel-End Hendrickson Long-life System (HLS™) brochure, Nov. 2004.

Consolidated Metco, Inc., PreSet® Hub Assemblies brochure, Feb. 2005.

Hendrickson Trailer Suspension Systems, Technical Procedure INTRAAX® Suspension Systems, Wheel-End Maintenance Procedures manual, Apr. 2005.

The Timken Company, page from Wheel Boss® Wheel-End System web site, as displayed in May 2007.

Penton Media, Inc., Bulk Transporter, Timken crafts Wheel Boss for longer life web page, as displayed in May 2007.

* cited by examiner

AXLE SPINDLE AND WHEEL END ASSEMBLY

CROSS-REFERENCE TO RELATED APPLICATION

This application claims the benefit of U.S. Provisional Patent Application Ser. No. 60/713,887, filed on Sep. 2, 2005, and U.S. Provisional Patent Application Ser. No. 60/713,888, filed on Sep. 2, 2005.

BACKGROUND OF THE INVENTION

1. Technical Field

The invention relates to vehicle axles and wheel end assemblies, and in particular to axles and wheel end assemblies for heavy-duty vehicles, such as tractor-trailers. More particularly, the invention is directed to a heavy-duty axle spindle and wheel end assembly that are capable of selectively accommodating a conventional dual-wheel, standard-tire configuration and a single-wheel, wide-tire configuration in a robust, yet economical and lightweight manner.

2. Background Art

For many year's, the heavy-duty vehicle industry has utilized wheel end assemblies which typically are mounted on each end of one or more non-drive axles. Each wheel end assembly typically includes a hub rotatably mounted on a bearing assembly that in turn is immovably mounted on the outboard end of the axle, commonly known as an axle spindle. As is well known to those skilled in the art, for normal operation of the wheel end assembly to occur, the bearing assembly and surrounding components must be lubricated with grease or oil. Therefore, the wheel end assembly must be sealed to prevent leakage of the lubricant, and also to prevent contaminants from entering the assembly, both of which could be detrimental to its performance. More specifically, a hubcap is mounted on an outboard end of the wheel hub, and a main seal is rotatably mounted on an inboard end of the hub and the bearing assembly in abutment with the axle spindle, resulting in a closed or sealed wheel end assembly.

While most wheel end assemblies include these general features, the design and arrangement of the hub, bearing assembly, hubcap, main seal, and other components, as well as the axle spindle, vary according to the specific vehicle design and its anticipated uses. For example, some heavy-duty vehicles include axle spindles and wheel end assemblies designed for a dual-wheel, standard-tire configuration in which two wheels, each having a respective tire mounted thereon, are mounted on a single hub.

In a dual-wheel, standard-tire configuration, the focus of the load forces acting on the axle spindle and the wheel end assembly during operation of the vehicle, typically referred to in the art as the load line, acts on a plane that extends generally vertically through the axle spindle and the wheel end assembly at a point between the two wheels. Such a load line is located further inboard than load lines of other wheel configurations, to be discussed below, thus creating a shorter moment arm than that created by other wheel configurations. A shorter moment arm in turn creates less loading on the components of the axle spindle and the wheel end assembly than a wheel configuration that has a load line which is further outboard and thus a longer moment aim. As a result, the hub, bearing assembly and axle spindle for a dual-wheel, standard-tire configuration typically are of a comparatively less robust construction than the hub, bearing assembly and axle spindle used with types of wheel configurations that have a load line which is further outboard. This less robust construction enables the axle spindle and wheel end assembly to be comparatively lightweight and economical for dual-wheel, standard-tire configurations, which is desirable in the heavy-duty vehicle industry.

Due to common wheel attachment interfaces, such a less robust axle spindle and wheel end assembly construction may also selectively accommodate a single-wheel, wide-tire configuration, in which one wheel with a single wide tire mounted thereon is in turn mounted on the hub. This single wide tire is a high weight capacity and high speed capacity tire that is intended to replace a dual-wheel, standard-tire configuration. However, the less robust construction of the axle spindle and the wheel end assembly limits the range of single-wheel, wide-tire types to ones having only a zero offset or a near-zero offset, such as an 0.56-inch offset, to keep the load line in a location that is similar to that of the above-described dual-wheel, standard-tire configuration. Any other type of single-wheel, wide-tire configuration moves the load line further outboard, and thus places an increased load on the outboard beating of the bearing assembly, which causes that beating to experience increased fatigue loading and significantly reduces its useful life.

More particularly, a zero-offset wheel is one in which the vertical centerline of the wheel is generally aligned with the mounting surface of the hub or brake drum, which reduces the operational load forces on the axle spindle and the wheel end assembly, and on the outboard beating in particular. However, a single-wheel, wide-tire with a zero offset has a narrower wheel base than a dual-wheel, wide tire configuration, which creates certain disadvantages when it is desired to change from one type of wheel configuration to another on a heavy-duty vehicle, such as a semi-trailer. For example, if it is desired to change from a dual-wheel, standard-tire configuration to a single-wheel, wide-tire configuration and maintain roll stability of the vehicle, the frame, subframe, axle and/or suspension assemblies of the semi-trailer must be modified to move the wheels further apart and widen the wheel base. In addition, if it is desired to return to a dual-wheel, standard-tire configuration after such modifications for a zero-offset, single-wheel, wide-tire configuration, additional modifications must be performed to move the wheels closer together, so the tires do not extend outboardly past the body of the vehicle and exceed legal restrictions on the width of a heavy-duty vehicle. The time and expense for such modifications associated with roll stability thereby reduce the desirability of a zero-offset single-wheel, wide-tire configuration for a less robust axle spindle and wheel end assembly.

In contrast, axle spindles and wheel end assemblies that are of a more robust construction are able to selectively accommodate a wider range of single-wheel, wide-tire configurations, including wheels having a two-inch offset, as well as a dual-wheel, standard-tire configuration. A two-inch offset wheel is one in which the vertical centerline of the wheel is located about two inches outboard of the mounting surface of the hub or brake drum, which creates increased operational load forces. That is, the load line acts on a vertical plane that is further outboard than the load line associated with a dual-wheel, standard-tire configuration or a zero-offset, single-wheel configuration. Since the load line of the two-inch offset wheel configuration is further outboard, a greater moment arm is created, leading to increased loading on the components of the axle spindle and the wheel end assembly. Such increased loading creates the need for the more robust construction of the wheel end assembly, including the hub and bearing assembly, especially the outboard bearing of the bearing assembly, as well as the axle spindle, to obtain acceptable bearing and spindle life.

As mentioned above, the axle spindles and wheel end assemblies of more robust construction also are able to accommodate a dual-wheel, standard-tire configuration. To this end, when a heavy-duty vehicle such as a semi-trailer uses a single-wheel, wide-tire configuration, the advantage of the two-inch offset wheel is that such wheels generally include a relatively wide wheel base that is roll stable. As a result, modifications of the frame, subframe, axle and/or suspension assemblies are not necessary when it is desired to change from a dual-wheel, standard-tire configuration to a single-wheel, wide-tire configuration, or back to a dual-wheel, standard-tire configuration. However, the disadvantage of such more robust axle spindles and wheel end assemblies is that they are typically relatively heavy and/or expensive, and are not optimized for the different load line conditions of a dual-wheel, standard tire configuration and a single-wheel, wide tire configuration, which are undesirable characteristics.

The capability of certain heavy-duty vehicles to selectively accommodate a dual-wheel, standard-tire configuration and a single-wheel, two-inch offset wide-tire configuration is becoming increasingly important in the heavy-duty vehicle industry. For example, it is becoming more common for the owner of a fleet of heavy-duty vehicles to use a single-wheel, two-inch offset wide-tire configuration on his/her vehicles, since such a wheel configuration is associated in the industry with high performance, lower weight, and fuel savings. However, when the owner sells the vehicles, the owner will convert them to a dual-wheel, standard-tire configuration to make them more attractive in the used vehicle market. In order to obtain the legal maximum axle rating for a single-wheel, two-inch offset wide-tire configuration, which by way of example is 20,000 pounds, and for a dual-wheel, standard-tire configuration, which by way of example is 23,000 pounds, an axle spindle and wheel end assembly of more robust construction must be used, as described above. However, the increased weight and/or cost associated with the more robust axle spindle and wheel end assembly are undesirable.

Moreover, the bearing assembly of a prior art wheel end assembly typically includes an inboard bearing and an outboard bearing. In certain wheel end assembly configurations, a bearing spacer extends between the inboard and outboard bearings. Many bearing spacers have a relatively significant length, which may be due to various factors, such as the length of the axle spindle. Such a significant length for a bearing spacer can increase the difficulty of maintaining a precise, repeatable length-related tolerance during manufacture, thereby possibly undesirably reducing the life of the main seal and/or the fatigue life of the bearings. More particularly, the bearing spacer sets a specific gap between the bearings, so that a specific preload of the bearing cones and bearing spacer is achieved once the wheel end assembly is properly assembled on the axle spindle. When the bearing spacer is relatively long it has a greater variance in its length than a shorter bearing spacer, since the length-related dimensional tolerance of a spacer generally increases as the desired length of the spacer increases. Thus, for a long bearing spacer, it is difficult to maintain a precise, repeatable length-related tolerance.

When a precise, repeatable length-related tolerance is not maintained, the bearing spacer may be longer than a desired length, which may allow excessive axial end play of the wheel end assembly relative to the axle spindle, which in turn may allow excessive movement of the main seal, possibly reducing the life of the main seal. Alternatively, the bearing spacer may be shorter than a desired length, which may create an overloading of the bearings when the wheel end assembly is assembled on the axle spindle, which in turn may reduce the fatigue life of the bearings.

These disadvantages of prior art axle spindles and wheel end assemblies make it desirable to develop an axle spindle and a wheel end assembly that are capable of selectively accommodating a dual-wheel, standard-tire configuration and a single-wheel, two-inch offset wide-tire configuration in a relatively economical and lightweight manner, and which facilitate the optional use of a bearing spacer that provides an improved repeatable length-related tolerance. The present invention satisfies these needs.

SUMMARY OF THE INVENTION

An objective of the present invention is to provide an axle spindle and a wheel end assembly that ate capable of selectively accommodating a dual-wheel, standard-tire configuration and a single-wheel, two-inch offset wide-tire configuration in a relatively economical manner.

Another objective of the present invention is to provide an axle spindle and a wheel end assembly that are capable of selectively accommodating a dual-wheel, standard-tire configuration and a single-wheel, two-inch offset wide-tire configuration in a relatively lightweight manner.

Yet another objective of the present invention is to provide an axle spindle and a wheel end assembly that are capable of selectively accommodating a dual-wheel, standard-tire configuration and a single-wheel, wide-tire configuration without modifications to the vehicle frame, subframe, axle and/or suspension assemblies.

Still another objective of the present invention is to provide an axle spindle and a wheel end assembly that facilitate the optional use of a beating spacer that provides an improved repeatable length-related tolerance.

These objectives and others are obtained by the axle spindle and wheel end assembly combination of the present invention. A heavy-duty vehicle includes an axle having a central portion and a pair of axle spindles. The axle central portion has a pair of ends and each one of the pair of axle spindles is connected to a respective one of the central portion ends. The heavy-duty vehicle also includes a pair of wheel end assemblies, and each one of the pair of wheel end assemblies is rotatably mounted on a respective one of the axle spindles. Each one of the axle spindle and the wheel end assembly combination includes an inboard bearing immovably mounted on the axle spindle and an outboard bearing immovably mounted on the axle spindle outboardly of the inboard bearing. The inboard and outboard bearings include respective inner diameters of generally the same size, and the wheel end assembly is capable of utilizing a heavy-duty vehicle stock-type bearing for at least one of the inboard and outboard bearings. A wheel hub is rotatably mounted on the inboard and said outboard bearings, and the wheel end assembly selectively accommodates a dual-wheel, standard-tire configuration and a single-wheel, wide-tire configuration, including a two-inch offset type wheel for the single-wheel, wide-tire configuration.

These objectives and others are also obtained by the axle spindle and wheel end assembly combination of the present invention. A heavy-duty vehicle includes an axle having a central portion and a pair of axle spindles. The axle central portion has a pair of ends and each one of the pair of axle spindles is connected to a respective one of the central portion ends. The heavy-duty vehicle also includes a pair of wheel end assemblies, and each one of the pair of wheel end assemblies is rotatably mounted on a respective one of the axle spindles. Each one of the axle spindle and the wheel end assembly combination includes an inboard bearing immovably mounted on the axle spindle and an outboard bearing immovably mounted on the axle spindle outboardly of the inboard bearing. A bearing spacer is disposed between the inboard and outboard bearings, and has an outer diameter and an axial length. A ratio of the bearing spacer axial length to the bearing spacer outer diameter is in a range of from about 0.20 to about 0.85. A wheel hub is rotatably mounted on the inboard and said outboard bearings, and the wheel end assembly selectively accommodates a dual-wheel, standard-tire configuration and a single-wheel, wide-tire configuration, including a two-inch offset type wheel for the single-wheel, wide-tire configuration.

BRIEF DESCRIPTION OF THE DRAWINGS

The preferred embodiment of the present invention, illustrative of the best mode in which applicant has contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
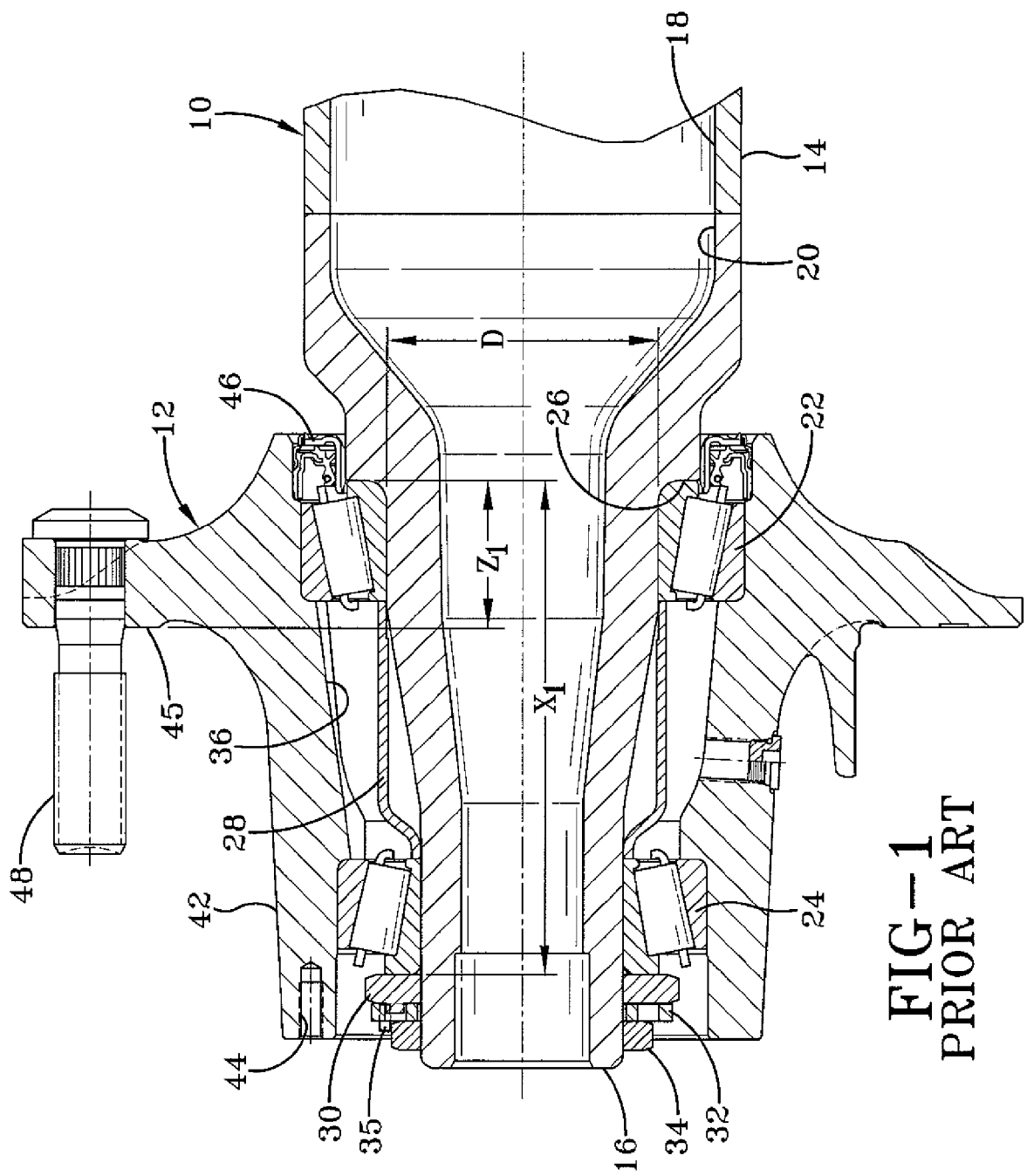
FIG. 1 is a fragmentary longitudinal cross-sectional view of a portion of an axle and a less robust axle spindle and wheel end assembly of the prior art.

In order to better understand the axle spindle and wheel end assembly of the present invention, a less robust prior art axle spindle and wheel end assembly for a heavy-duty vehicle, typically used for an economical dual-wheel, standard-tire configuration, is shown in FIG. 1 and now will be described. Axle 10 depends from and extends transversely across the trailer of a heavy-duty tractor-trailer (not shown). A typical heavy-duty tractor-trailer includes one or more non-drive axles 10 suspended from the trailer, with each of the axles having a wheel end assembly 12 mounted on each end of the axle. For the sake of clarity only one axle end and wheel end assembly 12 will be described herein. Axle 10 includes a central tube 14, and an axle spindle 16 is integrally connected by any suitable means, such as welding, to each end of the central tube. Axle central tube 14 generally is tubular-shaped and is formed with an internal cavity 18. Axle spindle 16 is tapered and is formed with a correspondingly tapered internal cavity 20.

Wheel end assembly 12 includes a bearing assembly having an inboard bearing 22 and an outboard bearing 24 immovably mounted on axle spindle 16. That is, inboard bearing 22 is mounted on the outer diameter of axle spindle 16 with its inboard surface in abutment with a shoulder 26 formed in the axle spindle. Outboard bearing 24 is mounted on axle spindle 16 near the outboard end of the axle spindle, and thereby includes a smaller inner diameter than inboard bearing 22 due to the taper of the axle spindle. The reduced inner diameter of outboard bearing 24, when compared to the inner diameter of inboard bearing 22, correspondingly reduces the ability of the outboard bearing to withstand operational load forces to the same extent as the inboard bearing, and the outboard bearing thus is generally less robust than the inboard bearing.

More specifically, inboard and outboard beatings 22, 24 are standard heavy-duty vehicle stock bearings. For example, inboard bearing 22 typically is a tapered roller bearing having an inner diameter of about 90 millimeters, an outer diameter of about 147 millimeters, a width of about 40 millimeters, a pure radial load rating of about 14,800 pound-feet, a pure thrust load rating of about 8,420 pound-feet, and an industry standard part number of HM218248 (cone)/HM218210 (cup). As an additional example, outboard bearing 24 typically is a tapered roller bearing having an inner diameter of about 2.625 inches, an outer diameter of about 4.8125 inches, a width of about 1.500 inches, a pure radial load rating of about 12,200 pound-feet, a pure thrust load rating of about 7,030 pound-feet, and an industry standard part number of HM212049 (cone)/HM212011 (cup).

A cavity 36 is formed between inboard and outboard bearings 22, 24 and a correspondingly-tapered bearing spacer 28 optionally is disposed between the bearings in the cavity to conveniently maintain proper spacing between the bearings. A nut assembly, which includes an inboard nut 30, a lock washer 32, an outboard nut 34, and a set screw 35, threadably engages the outboard end of axle spindle 16 and secures bearings 22, 24 and bearing spacer 28 in place. Bearings 22, 24 are typically spaced such that the distance from the inboard surface of the inboard bearing proximate shoulder 26 to the outboard surface of the outboard bearing proximate nut 30, indicated in FIG. 1 as $X_1$, is about 6.42 inches or 163 millimeters, the significance of which will be discussed in greater detail below.

A wheel hub 42 is rotatably mounted on inboard and outboard bearings 22, 24 in a manner well known to those skilled in the art. A hubcap (not shown) is mounted on the outboard end of hub 42 by a plurality of bolts that each pass through a respective one of a plurality of openings formed in the hubcap, and threadably engage a respective one of a plurality of aligned threaded openings 44 formed in the hub. In this manner, the hubcap closes the outboard end of wheel end assembly 12. A main continuous seal 46 is rotatably mounted on the inboard end of wheel end assembly 12 and closes the inboard end of the assembly. More particularly, seal 46 is mounted on wheel end assembly 12 in a suitable manner and radially bridges hub 42 and axle spindle 16 to seal cavity 36. In order to maintain proper lubrication and operation of inboard and outboard bearings 22, 24, a suitable amount of lubricant (not shown) is introduced into cavity 36. A plurality of interference fit studs 48 (only one shown) are used to mount a brake drum, tire rim and tire (not shown) against a mounting face 45 of hub 42 and thus on wheel end assembly 12.

One aspect of prior art axle spindle 16 and wheel end assembly 12 that is potentially disadvantageous is the relationship between distance $X_1$, which is the distance from the inboard surface of inboard beating 22 to the outboard surface of outboard bearing 24, and the maximum diameter of axle spindle 16 at the bearings, indicated as D. In order to achieve the ever-present goal of reducing weight in heavy-duty vehicles, it is desirable to shorten the length of axle spindle 16 and wheel hub 42 relative to the diameter of the axle spindle as much as possible. Therefore, the relationship between distance $X_1$ and diameter D, which may be expressed as a ratio $R_1$, becomes an indicator of how effectively a particular axle spindle and wheel end assembly achieves weight reduction through the design of axle spindle 16 and wheel hub 42. As mentioned above, distance $X_1$ is about 163 millimeters, and the maximum diameter D of axle spindle 16 at bearings 22, 24 is about 90 millimeters, and thus ratio $R_1$, which is $X_1$ divided by D, is about 1.81. This value for $R_1$ is relatively large, as it is desirable to achieve a smaller ratio, such as below about 1.50. As a result, while prior-art axle spindle 16 and wheel end assembly 42 are suitable for their intended purpose, and are considered to be lightweight in comparison to other prior art systems, their design does not achieve an optimum weight savings.

Another aspect of prior art axle spindle 16 and wheel end assembly 12 that is potentially disadvantageous is the axial location of mounting face 45 of hub 42, which does not optimize the accommodation of a dual-wheel, standard-tire configuration and a two-inch offset single-wheel, wide-tire configuration. More particularly, the axial location of hub mounting face 45 is dictated by the load line of the wheel configuration for which axle spindle 16 and wheel end assembly 12 are designed to accommodate. The axial location of hub mounting face 45 is indicated by the distance from the inboard surface of inboard bearing 22 to the hub mounting face, which is shown in FIG. 1 as $Z_1$. For certain specific wheel designs associated with prior art axle spindle 16 and wheel end assembly 12, $Z_1$ is about 1.79 inches, and may be up to about 1.91 inches for other specific wheel designs associated with this axle spindle and wheel end assembly. Such a minimum length of 1.79 inches for distance $Z_1$, is considered to be relatively long, which indicates that the location of hub mounting face 45 is dictated by a dual-wheel, standard-tire configuration, and therefore is not optimized for both the dual-wheel, standard-tire configuration and a two-inch offset single-wheel, wide-tire configuration.

In addition, a particular feature that contributes to the less robust, and hence more economical design of prior art axle spindle 16 and wheel end assembly 12 is the tapered shape of the axle spindle. This taper of axle spindle 16 creates a correspondingly small outer diameter at the outboard end of the axle spindle, which in turn causes the diameter of outboard bearing 24 to be smaller than the diameter of inboard bearing 22, as mentioned above. The reduced diameter of outboard bearing 24, while enabling the bearing to be economical, correspondingly reduces the ability of the bearing to satisfactorily withstand operational load forces generated by the industry-preferred two-inch offset single-wheel, wide-tire type configuration, as described above.

An additional disadvantage of prior art axle spindle 16 and wheel end assembly 12 is the length of bearing spacer 28 that is necessitated by the design of the axle spindle and wheel end assembly. As described above, a long bearing spacer increases the difficulty of maintaining a precise, repeatable length-related tolerance during manufacture. Bearing spacer 28 has an axial length that reduces the precision of the length-related manufacturing tolerance that may be achieved. More particularly, bearing spacer 28 is about 85.0 millimeters long and has a maximum outer diameter of about 95.3 millimeters. The ratio of the length to the outer diameter of bearing spacer 28 provides a convenient indicator of the precision control over the length of bearing spacer 28. More particularly, the larger the value of the ratio, such as a value that is about 1.0 or greater than 1.0, the more likely that precision control over the length of bearing spacer 28 will be difficult to maintain. In this case, the ratio is about 0.89, which is relatively close to 1.0.

As a result, it is difficult to maintain precision length control of bearing spacer 28. An inconsistent overall length of bearing spacer 28 may allow the spacer to be too long, which may allow excessive axial end play of wheel end assembly 12 relative to axle spindle 16, which may in turn allow excessive movement of main seal 46, possibly reducing the life of the main seal. Alternatively, an inconsistent overall length of bearing spacer 28 may allow the spacer to be too short, which may create an overloading of bearings 22, 24 when wheel end assembly 12 is assembled on axle spindle 16, which may in turn reduce the fatigue life of the bearings.

Figure 2:
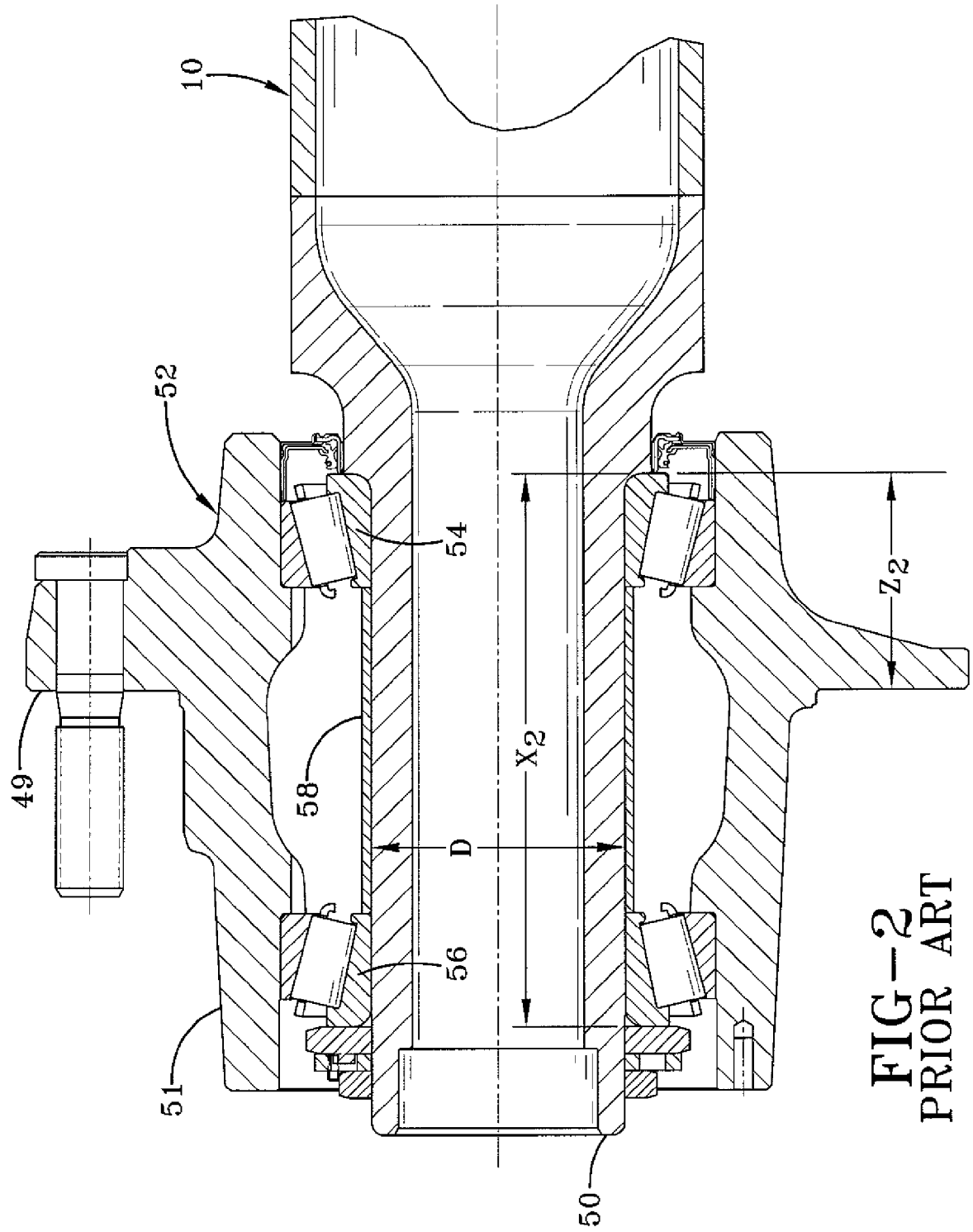
FIG. 2 is a fragmentary longitudinal cross-sectional view of a portion of an axle and a first more robust axle spindle and wheel end assembly of the prior art.

To satisfactorily withstand the forces associated with a two-inch offset single-wheel, wide-tire type configuration, a first type of more robust prior art axle spindle 50 and wheel end assembly 52 therefore typically are employed, and are shown in FIG. 2. Particularly distinguishing features of first more robust prior art axle spindle 50 and wheel end assembly 52, as compared to less robust prior art axle spindle 16 and wheel end assembly 12 (FIG. 1), include a generally straight shape of the axle spindle, rather than a tapered shape, and increased length of the axle spindle and of wheel hub 51. In addition, wheel end assembly 52 includes an inboard bearing 54 and an outboard bearing 56 mounted on the outboard end of axle spindle 50 that are of the same diameter, and therefore are both generally capable of satisfactorily withstanding operational load forces of the type generated by the industry-preferred two-inch offset single-wheel, wide-tire type configuration.

Inboard and outboard bearings 54, 56 are high weight capacity, low manufacturing volume bearings. For example, inboard and outboard bearings 54, 56 typically are tapered roller bearings, each having an inner diameter of about 3.500 inches, an outer diameter of about 6.000 inches, a width of about 1.5625 inches, a pure radial load rating of about 16,000 pound-feet, a pure thrust load rating of about 11,000 pound-feet, and an industry standard part number of HM518445 (cone)/HM518410 (cup). A straight bearing spacer 58 optionally is disposed between inboard bearing 54 and outboard bearing 56, and generally conforms to the straight shape of axle spindle 50. Bearings 54, 56 are typically spaced such that the distance from the inboard surface of the inboard bearing to the outboard surface of the outboard bearing, indicated in FIG. 2 as $X_2$, is about 7.625 inches, or about 194 millimeters.

Particular features making prior art axle spindle 50 and wheel end assembly 52 more robust, and thus able to satisfactorily withstand the forces associated with the industry-preferred two-inch offset single-wheel, wide-tire type configuration, are the generally straight shape of the axle spindle, the corresponding uniform diameter of both inboard and outboard bearings 54, 56, and the increased length of the axle spindle and of wheel hub 51. However, these same features, while adding robustness to handle heavier operational loads, also undesirably add weight and cost to axle spindle 50 and wheel end assembly 52. In addition, such bearings 54, 56 are less prevalent in the heavy-duty vehicle industry, and therefore are not as readily available in repair shops, and are consequently more expensive than stock bearings.

Moreover; prior art axle spindle 50 and wheel end assembly 52 also include a large value for the relationship between distance $X_2$ and the maximum diameter of axle spindle 50 at the bearings, indicated as D. As mentioned above, in order to achieve the ever-present goal of reducing weight, it is desirable to shorten the length of axle spindle 50 and wheel hub 51 relative to the diameter of the axle spindle as much as possible. Therefore, the relationship between distance $X_2$ and diameter D, which may be expressed as a ratio $R_2$, becomes an indicator of how effectively a particular axle spindle and wheel end assembly achieves weight reduction through the design of axle spindle 50 and wheel hub 51. As mentioned above, distance $X_2$ is about 194 millimeters, and the maximum diameter D of axle spindle 50 at bearings 22, 24 is about 90 millimeters, and thus ratio $R_2$, which is $X_2$ divided by D, is about 2.16. This value for $R_2$ is relatively large, as it is desirable to achieve a smaller ratio, such as below about 1.50. As a result, while prior-art axle spindle 50 and wheel end assembly 52 are suitable for their intended purpose, their design does not achieve an optimum weight savings.

Furthermore, prior art axle spindle 50 and wheel end assembly 52 also include a disadvantageous axial location of a mounting face 49 formed on hub 51, which does not optimize the accommodation of a dual-wheel, standard-tire configuration and a two-inch offset single-wheel, wide-tire configuration. As mentioned above, the axial location of hub mounting face 49 is dictated by the load line of the wheel configuration for which axle spindle 50 and wheel end assembly 52 are designed to accommodate. Distance $Z_2$, which indicates the axial location of hub mounting face 49, is about 2.85 inches for certain specific wheel designs associated with prior art axle spindle 50 and wheel end assembly 52, and may be up to about 2.98 inches for other specific wheel designs associated with this axle spindle and wheel end assembly. Such a minimum length of 2.85 inches for distance $Z_2$ is considered to be relatively long, which indicates that the location of hub mounting face 49 is dictated by a dual-wheel, standard-tire configuration, and therefore is not optimized for both the dual-wheel, standard-tire configuration and a two-inch offset single-wheel, wide-tire configuration.

An additional disadvantage of prior art axle spindle 50 and wheel end assembly 52 is the length of bearing spacer 58 that is necessitated by the design of the axle spindle and wheel end assembly. Bearing spacer 58 has an axial length that is greater than its outer diameter, reducing the precision of the length-related manufacturing tolerance that may be achieved. More particularly, bearing spacer 58 is about 114.3 millimeters long and includes a maximum outer diameter of about 95.3 millimeters. The ratio of the length of bearing spacer 58 to the maximum outer diameter of the bearing spacer is about 1.20, indicating that precision length control of the bearing spacer is difficult to maintain. Such difficulty may lead to an inconsistent overall length of bearing spacer 58 during manufacture. This in turn may allow bearing spacer 58 to be too long, which may allow excessive axial end play of wheel end assembly 52 relative to axle spindle 50, which may in turn allow excessive movement of main seal 53, possibly reducing the life of the main seal. Alternatively, an inconsistent overall length of bearing spacer 58 may allow the spacer to be too short, which may create an overloading of bearings 54, 56 when wheel end assembly 52 is assembled on axle spindle 50, which may reduce the fatigue life of the bearings.

Figure 3:
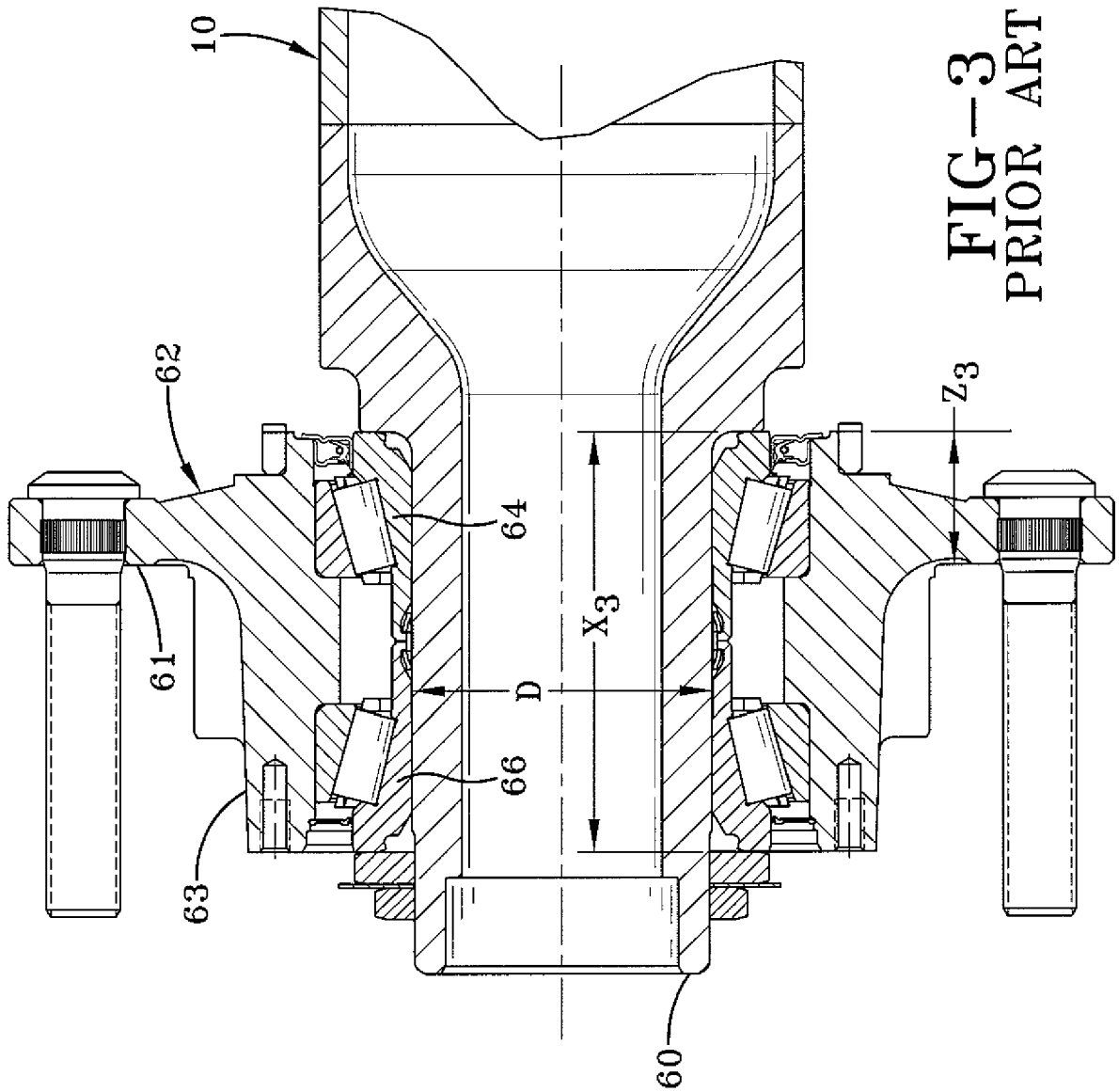
FIG. 3 is a fragmentary longitudinal cross-sectional view of a portion of an axle and a second more robust axle spindle and wheel end assembly of the prior art.

A second more robust prior art axle spindle and wheel end assembly are shown in FIG. 3 and are indicated at 60 and 62, respectively. Similar to axle spindle 50 shown in FIG. 2, axle spindle 60 is generally straight, thereby enabling inboard and outboard bearings 64, 66, respectively, to be the same diameter, and thus comparable in the operational load forces that each can handle. Axle spindle 60 is relatively short, which eliminates the need for a bearing spacer and results in a relatively short hub 63. However, this specialized design necessitates high-end, and thus costly, inboard and outboard bearings 64, 66 that abut one another, commonly referred to as unitized bearings. For example, inboard and outboard bearings 64, 66 comprise a unitized tapered roller bearing set, preferably having an inner diameter of about 90 millimeters and a width, which is measured from the inboard surface of the inboard bearing to the outboard surface of the outboard bearing, which is indicated in FIG. 3 as $X_3$, of about 125 millimeters. Due to the specialized nature of inboard and outboard bearings 64, 66, they do not have an industry-standard part number, as do other prior art bearings 22, 24, 54 and 56.

The value for the relationship between the width $X_3$ of bearings 64, 66 and the maximum diameter of axle spindle 60 at the bearings, indicated as D, is a relatively small, desirable value. More particularly, as mentioned above, width $X_3$ of bearings 64, 66 is about 125 millimeters, and the maximum diameter D of axle spindle 60 at bearings 64, 66 is about 90 millimeters. Thus, the relationship between distance $X_3$ and diameter D, which may be expressed as a ratio $R_3$ in which $X_3$ is divided by D, is about 1.39. This relatively small value is due primarily to the unitized nature of bearings 64, 66, since they abut one another, which eliminates any gap between them. As a result, the length of axle spindle 60 and wheel hub 63 can be shortened to a degree that results in an optimum reduced weight for the axle spindle and wheel end assembly 62.

In addition, prior art axle spindle 60 and wheel end assembly 62 include a location of a mounting face 61 that optimizes the accommodation of a dual-wheel, standard-tire configuration and a two-inch offset single-wheel, wide-tire configuration. More particularly, distance $Z_3$, which indicates the axial location of hub mounting face 61, is about 1.55 inches. Such a length for distance $Z_3$ is considered to be optimum for accommodating the respective load lines associated with a dual-wheel, standard-tire configuration and a two-inch offset single-wheel, wide-tire configuration.

However, despite the desirably low value of ratio $R_3$, which indicates optimum reduced weight of axle spindle 60 and wheel hub 63, and relatively short distance $Z_3$, which indicates an optimum axial location for hub mounting face 61 for accommodation of both a dual-wheel, standard-tire configuration and a two-inch offset, single-wheel configuration, as well as the ability of the design of the axle spindle and wheel end assembly 62 to handle heavier operational loads of the type created by the use of the two-inch offset single-wheel, wide-tire type configuration, the high cost for inboard and outboard bearings 64, 66 creates a distinct disadvantage. That is, as mentioned above, due to their precise specialized nature, as dictated by the design of axle spindle 60 and wheel end assembly 62, bearings 64, 66 are not standard stock bearings. Therefore, they are more expensive to purchase than other stock bearings, and may be more difficult to obtain, particularly in the field such as for a repair or replacement, which may be undesirable for certain heavy-duty vehicle owners and operators. These disadvantages in turn may make axle spindle 60 and wheel end assembly 62 undesirable for such certain heavy-duty vehicle owners and operators.

As mentioned above, the lack of robustness of prior art axle spindle 16 and wheel end assembly 12, and the high cost and/or weight of more robust prior art axle spindles 50, 60 and wheel end assemblies 52, 62, respectively, has created a need in the art for a lightweight and economical, yet robust, axle spindle and wheel end assembly that are capable of selectively accommodating a dual-wheel, standard-tire configuration and a two-inch offset single-wheel, wide-tire configuration, and which facilitate the optional use of a bearing spacer that provides an improved repeatable length-related tolerance. The present invention satisfies these needs, as will now be described.

Figure 4:
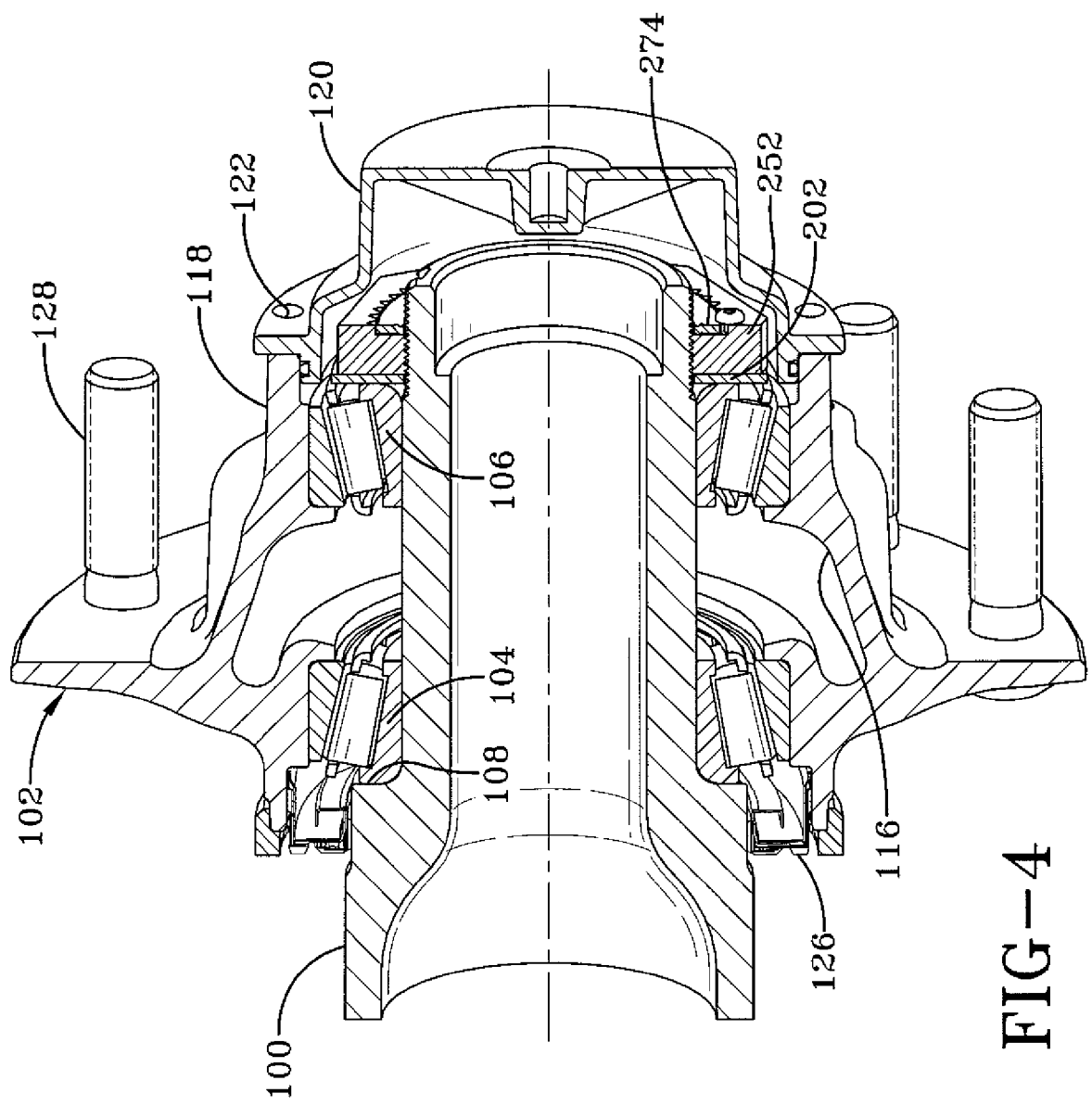
FIG. 4 is a fragmentary cross-sectional perspective view of the axle spindle and wheel end assembly of the present invention, shown with a hubcap installed on the wheel end assembly.
Figure 5:
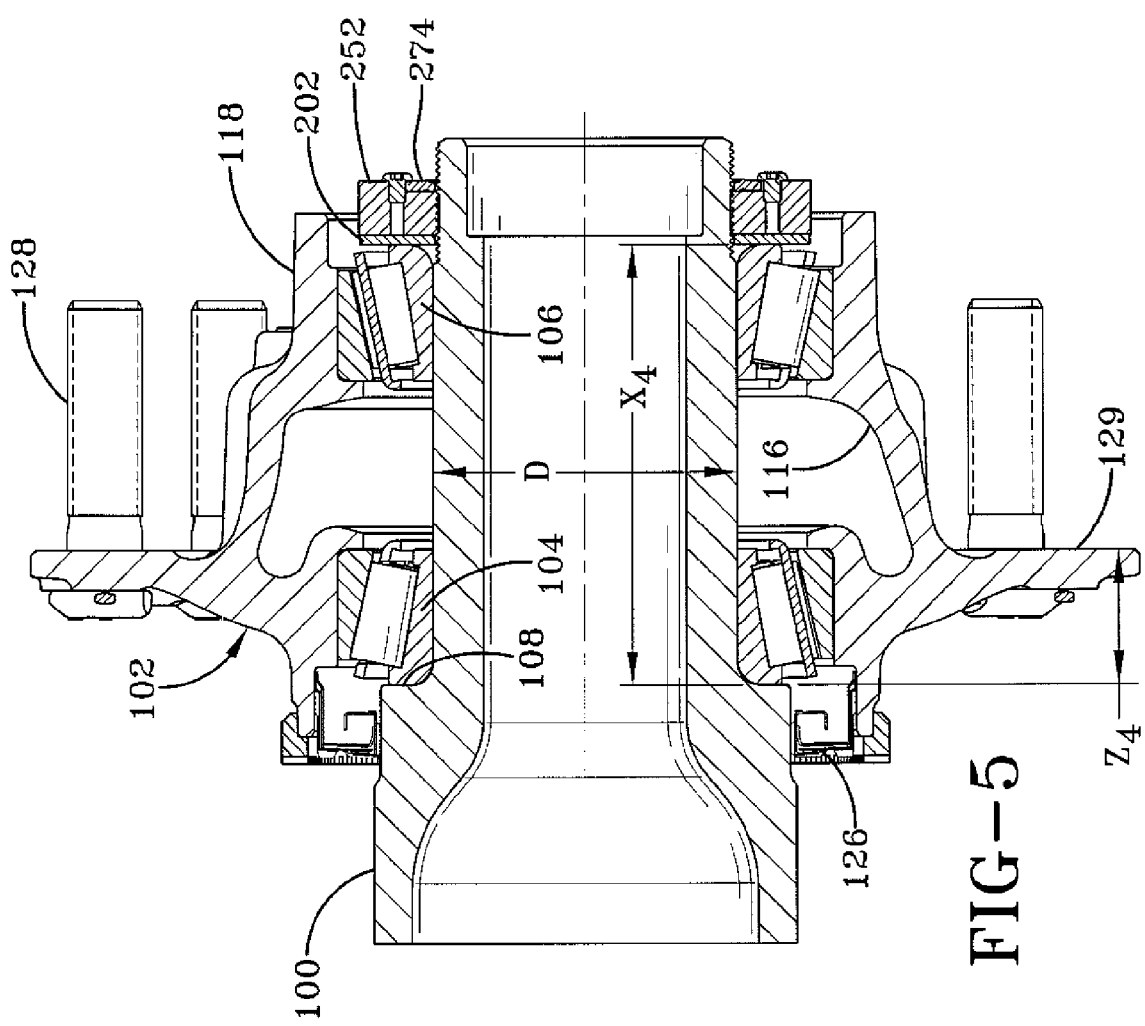
FIG. 5 is a fragmentary longitudinal cross-sectional view of the axle spindle and wheel end assembly shown in FIG. 4, but without the hubcap on the wheel end assembly.

Turning now to FIGS. 4 and 5, an axle spindle and a wheel end assembly of the present invention are indicated generally at 100 and 102, respectively. Axle spindle 100 is straight and is shorter than prior art axle spindles 16 and 50 to reduce weight. Wheel end assembly 102 includes a bearing assembly having an inboard bearing 104 and an outboard bearing 106 that are the same diameter and are immovably mounted on the outboard end of axle spindle 100. More particularly, inboard bearing 104 is mounted on the outer diameter of axle spindle 100 with its inboard surface in abutment with a shoulder 108 formed in the axle spindle. Inboard and outboard bearings 104, 106 preferably are standard heavy-duty vehicle stock bearings and are spaced-apart from one another. The robust nature of outboard bearing 106, being of about the same inner diameter as inboard bearing 104, enables a user to achieve a preload setting that increases the life of the bearing when compared to certain less robust outboard bearings of the prior art. For example, inboard and outboard beatings 104, 106 preferably are tapered roller beatings, each having an inner diameter of about 90 millimeters, an outer diameter of about 147 millimeters, a width of about 40 millimeters, a pure radial load rating of about 14,800 pound-feet, a pure thrust load rating of about 8,420 pound-feet, and an industry standard part number of HM218248 (cone)/HM218210 (cup).

Alternatively, inboard and outboard bearings 104, 106 may be selected from one of the following non-stock bearing groups, consisting of: higher quality, tighter tolerance bearings, known in the art as half-stand bearings; higher quality precision ground race roller bearings; or other special bearings. Nonetheless, if non-stock beatings are utilized, it is important to note that axle spindle 100 and wheel end assembly 102 will still accept standard stock bearings when the non-stock bearings need to be replaced, as will be described in greater detail below.

Figure 6:
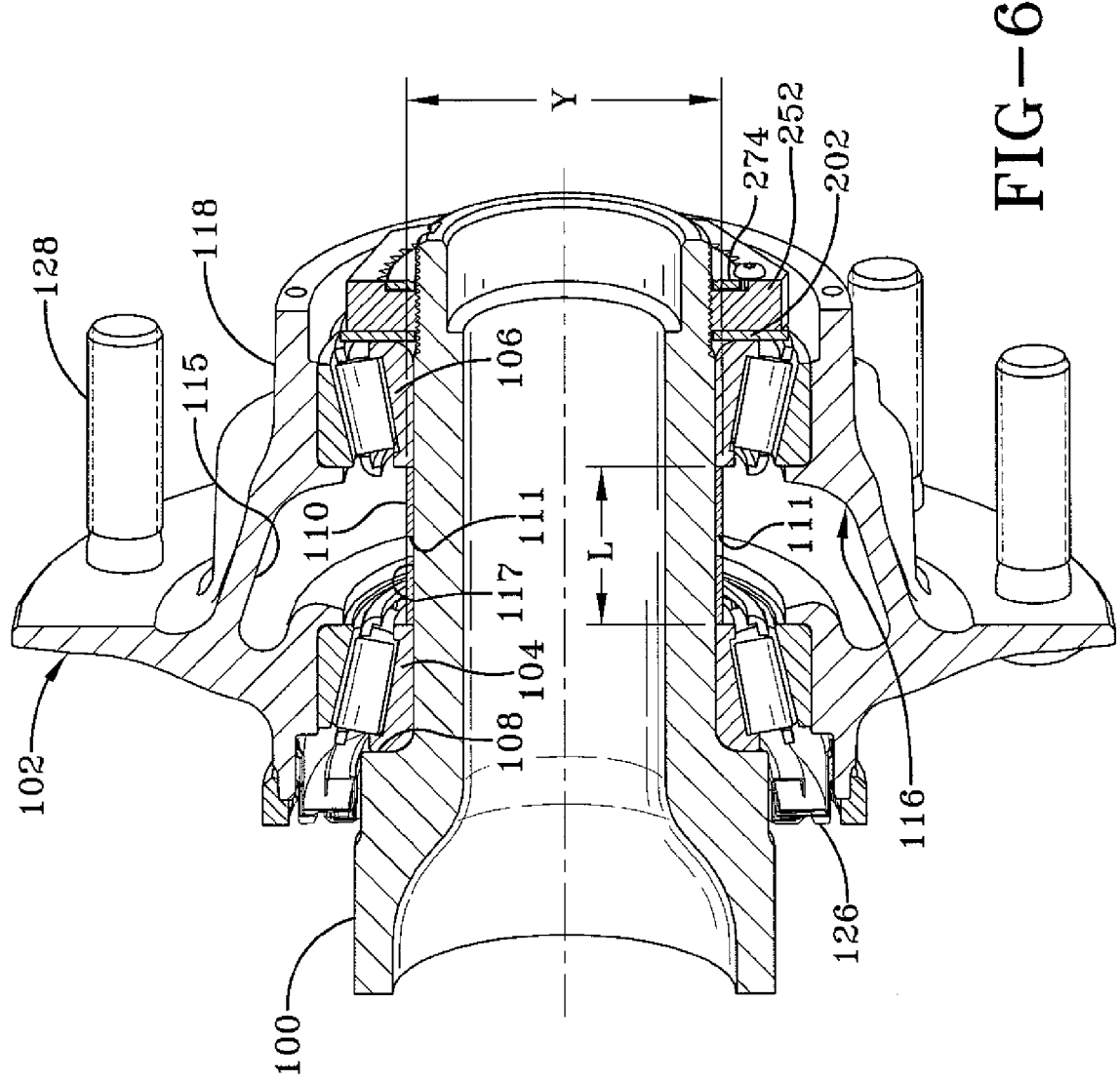
FIG. 6 is a view similar to FIG. 4, but showing the wheel end assembly without the hubcap and incorporating an optional bearing spacer.

A cavity 116 is formed between inboard and outboard bearings 104, 106, and a short, straight bearing spacer 110 optionally can be disposed between the bearings in the cavity, as shown in FIG. 6, to maintain spacing between the bearings. With continuing reference to FIGS. 4 and 5, a nut 252 also threadably engages the outboard end of axle spindle 100, and via an outer washer 274 an optional inner washer 202, secures bearings 104, 106 and any bearing spacer in place. Nut 252 is more fully described in application Ser. No. 11/494,438 filed concurrently herewith by the same assignee, Hendrickson USA, L.L.C., and which currently remains pending. Bearings 104, 106 are typically spaced such that the distance from the inboard surface of the inboard bearing proximate shoulder 108 to the outboard surface of outboard bearing proximate inner washer 202, indicated in FIG. 5 as $X_4$, is within a range of from about 125 millimeters to about 135 millimeters. Preferably, distance $X_4$ is about 130 millimeters. The range of from about 125 millimeters to about 135 millimeters is achieved by using an outboard bearing 106 with a different width, or by adjusting the axial position of the outboard bearing.

A wheel hub 118 is rotatably mounted on inboard and outboard bearings 104, 106 in a manner well known to those skilled in the art. A hubcap 120 is mounted on the outboard end of hub 118 by a plurality of bolts (not shown) that each pass through a respective one of a plurality of openings 122 formed in the hubcap, and threadably engage a respective one of a plurality of aligned threaded openings (not shown) formed in the hub. In this manner, hubcap 120 closes the outboard end of wheel end assembly 102. Hubcap 120 is more fully described in application Ser. No. 11/494,070 filed concurrently herewith by the same assignee, Hendrickson USA, L.L.C., which is now abandoned, and in application Ser. No. 11/941,597, filed by the same assignee, Hendrickson USA, L.L.C., which currently remains pending. A main continuous seal 126 is rotatably mounted on the inboard end of wheel end assembly 102 and closes the inboard end of the assembly. More particularly, seal 126 is mounted on wheel end assembly 102 in a suitable manner and radially bridges hub 118 and axle spindle 100 to seal cavity 116. In order to maintain proper lubrication and operation of inboard and outboard bearings 104, 106, a suitable amount of lubricant (not shown) is introduced into cavity 116. A plurality of interference fit studs 128 are used to mount a brake drum, tire rim and tire (not shown) against a mounting face 129 of hub 118 and thus on wheel end assembly 102.

Axle spindle 100 and wheel end assembly 102 are of a more robust construction, which enables them to selectively accommodate a dual-wheel, standard-tire configuration and a single-wheel, wide-tire configuration, including a single wheel configuration having a two-inch offset. More particularly, axle spindle 100 is generally straight, enabling both inboard and outboard bearings 104, 106 to be of the same diameter, thereby handling large operational loads. For example, axle spindle 100 and wheel end assembly 102 include a capacity rating of 10,000 pounds with a single two-inch offset wheel, and a capacity rating of 11,500 pounds with a pair of dual steel wheels. Since there are two axle spindles 100 and two wheel end assemblies 102 per axle, the axle spindle and wheel end assembly of the invention thus include an axle rating of 20,000 pounds for a single-wheel, two-inch offset wide-tire configuration, and a 23,000 pound axle rating for a dual-wheel, standard-tire configuration. It can therefore be seen that the present invention provides a lighter-weight package having a relatively short axle spindle 100 and a wheel end assembly 102, which mount two bearings 104, 106 of the stock type closer together, and thereby provides tighter tolerance control for the alignment of the wheel end assembly, which improves bearing life.

The optimization of weight achieved by axle spindle 100 and wheel end assembly 102 is shown by the relationship between distance $X_4$, which is the distance from the inboard surface of inboard bearing 104 to the outboard surface of outboard bearing 106, and the maximum diameter of the axle spindle at the bearings, indicated as D. The relationship between distance $X_4$ and diameter D may be expressed as a ratio $R_4$. As mentioned above, distance $X_4$ preferably is about 130 millimeters, and the maximum diameter D of axle spindle 100 at bearings 104, 106 is about 90 millimeters, and thus ratio $R_4$, which is $X_4$ divided by D, is about 1.44. When, as mentioned above, distance $X_4$ is 125 millimeters, $R_4$ is about 1.39, and when it is 135 millimeters, it is about 1.50. Thus, ratio $R_4$, ranging from about 1.39 to about 1.50, is smaller than the prior art ratio $R_1$ of 1.81 millimeters and the prior art ratio $R_2$ of 2.16 millimeters, showing that axle spindle 100 and wheel end assembly 102 effectively achieve significant weight reduction through a design that effectively shortens the length of the axle spindle and wheel hub 118. In addition, such a weight reduction is achieved using standard bearings 104, 106 that include a gap between them, rather than special unitized bearings 64, 66 found in prior art axle spindle 60 and wheel end assembly 62.

In addition, axle spindle 100 and wheel end assembly 102 include a location of hub mounting face 129 that optimizes the accommodation of a dual-wheel, standard-tire configuration and a two-inch offset single-wheel, wide-tire configuration in an economical manner. More particularly, distance $Z_4$, which indicates the axial location of hub mounting face 129, is about 1.55 inches. Such a length for distance $Z_4$ is considered to be optimum for accommodating the respective load lines associated with a dual-wheel, standard-tire configuration and a two-inch offset single-wheel, wide-tire configuration. This optimization is achieved using standard beatings 104, 106 that include a gap between them, rather than special unitized bearings 64, 66 found in prior art axle spindle 60 and wheel end assembly 62.

While inboard and outboard bearings 104, 106 preferably are of the stock type, axle spindle 100 and wheel end assembly 102 of the present invention also accept non-stock bearings, such as half-stand bearings or precision ground race roller bearings. By accepting both stock and non-stock types of beatings, axle spindle 100 and wheel end assembly 102 enable the use by heavy-duty vehicle owners and/or operators of higher quality non-stock bearings for inboard and outboard bearings, but yet provide the convenient and economical option of field replacement with readily available standard stock bearings.

In this manner, axle spindle 100 and wheel end assembly 102 of the present invention provide a more robust construction than prior art less robust axle spindle 16 and wheel end assembly 12. As a result, axle spindle 100 and wheel end assembly 102 of the present invention are able to satisfactorily withstand the forces associated with a two-inch offset single-wheel, wide-tire type configuration, while prior art less robust axle spindle 16 and wheel end assembly 12 cannot do so, due to the taper of the prior art axle spindle and correspondingly reduced diameter of outboard bearing 24. In addition, axle spindle 100 and wheel hub 118 are shorter in length than prior art axle spindle 16 and wheel hub 42, which reduces the weight of the axle spindle and wheel end assembly 102 of the present invention. Moreover, it has been discovered that the close proximity of inboard and outboard bearings 104, 106 to one another that is achieved by shorter spindle 100 and shorter hub 118, and the equal diameter of the bearings, enables a user to capitalize on tighter tolerance control of the bearing settings, which improves bearing life.

Axle spindle 100 and wheel end assembly 102 of the present invention are lighter in weight and are more economical than first robust axle spindle 50 and wheel end assembly 52 of the prior art. That is, the relatively short length of axle spindle 100 reduces the weight of the axle spindle, thereby having significantly less weight than prior art axle spindle 50. In addition, hub 118 may be of a compact design and thus shorter than prior art hub 51, and preferably is made from aluminum or austempered ductile iron, thereby contributing to further weight savings. Also, the close proximity of inboard and outboard bearings 104, 106 to one another that is achieved by shorter spindle 100 and shorter hub 118 enables a user to capitalize on tight tolerance control of the alignment of wheel end assembly 102 on the axle spindle, which provides a bearing life that is comparable to expensive, low-volume bearings 54, 56 used with prior art axle spindle 50 and wheel end assembly 52, with a lighter-weight construction. Moreover, the acceptance and/or use of stock bearings 104, 106 in wheel end assembly 102 of the present invention creates a significant cost savings when compared to the use of bearings 54, 56 in prior art wheel end assembly 52, which are less readily available in heavy-duty vehicle repair facilities. Thus, this acceptance and/or use of stock bearings 104, 106 also facilitates more economical, faster and more convenient repair of wheel end 102 of the present invention, as compared to repair of prior art wheel end 52.

Axle spindle 100 and wheel end assembly 102 of the present invention also are significantly mote economical than second robust axle spindle 60 and wheel end assembly 62 of the prior art. That is, the acceptance and/or use of stock inboard and outboard bearings 104, 106 significantly reduces the cost of wheel end assembly 102 when compared to prior art wheel end assembly 62, which necessitates the use of expensive, special unitized bearings 64, 66. Since bearings 104, 106 are stock bearings, they are also more readily available in heavy-duty vehicle repair facilities than special prior art bearings 64, 66. As a result, axle spindle 100 and wheel end assembly 102 of the invention are more economical than prior art axle spindle 60 and wheel end assembly 62, and are easier and more convenient to repair.

Thus, the combination of a more robust construction, lighter weight and lower cost allow an owner of a heavy-duty vehicle to use axle spindle 100 and wheel end assembly 102 of the present invention to selectively accommodate a conventional dual-wheel, standard-tire configuration and a single-wheel, wide-tire configuration, including a two-inch offset wheel, in a weight-competitive and economical manner. Moreover, such accommodation is achieved while maintaining a bearing life for inboard and outboard bearings 104, 106 that is acceptable in the heavy-duty vehicle industry.

In accordance with the above description, the present invention contemplates a range for ratio R, which is the distance X from the inboard surface of inboard bearing 104 to the outboard surface of outboard bearing 106 divided by the maximum diameter D of axle spindle 100 at the bearings. Ratio R for axle spindle 100 and wheel end assembly 102 of the present invention is from about 1.15 to about 1.75, and preferably from about 1.30 to about 1.60, and most preferably from about 1.39 to about 1.50. Also in accordance with the above description, the present invention contemplates a range for distance Z, which is the axial distance from the inboard surface of inboard bearing 104 to a wheel mounting face 129 formed on wheel hub 118. Distance Z is from about 1.20 inches to about 1.70 inches, and preferably is about 1.55 inches.

Turning now to FIG. 6, when it is desired to use optional bearing spacer 110, the design of axle spindle 100 and wheel end assembly 102 enables the bearing spacer to have a relatively short length, which desirably increases the precision and repeatability of the length-related manufacturing tolerance of the bearing spacer. More particularly, bearing spacer 110 preferably has an axial length L of about 50.0 millimeters and includes a maximum outer diameter Y of about 95.3 millimeters. The ratio of length L to diameter Y therefore is about 0.53, which is a desirably low value which indicates that precision over the length of beating spacer 110 will be easier to maintain than for prior art bearing spacers 28, 58.

It is to be understood that, since bearings 104, 106 may be spaced such that the distance from the inboard surface of the inboard beating proximate shoulder 108 to the outboard surface of the outboard bearing is within a range of from about 125 millimeters to about 135 millimeters, as mentioned above, length L of bearing spacer 110 may vary between about 45.0 and 55.0 millimeters. The ratio of length L to diameter Y may thus vary from about 0.47 to about 0.58, which is a desirably low range, again indicating that precision over the length of bearing spacer 110 will be easier to maintain than for prior art bearing spacers 28, 58.

In accordance with the above description, the present invention contemplates a range for the ratio of length L to diameter Y of bearing spacer 110 from about 0.20 to about 0.85, and preferably from about 0.30 to about 0.75, and most preferably from about 0.45 to about 0.60.

In this manner, a tighter tolerance may be maintained over the length of bearing spacer 110 during its manufacture, thereby reducing the problems associated with the inconsistent lengths of prior art bearing spacers 28, 58. The more repeatable, precise length of bearing spacer 110 of the present invention reduces excessive axial end play of wheel end assembly 102 relative to axle spindle 100, which in turn reduces movement of main seal 126 and extends the life of the main seal. The more repeatable, precise length achieved by bearing spacer 110 of the present invention also reduces overloading of bearings 102, 104 and thereby increases the fatigue life of the bearings.

With continuing reference to FIG. 6, when bearing spacer 110 is used, the bearing spacer effectively divides cavity 116 into a first portion 115 that is radially outward of the bearing spacer, and a second portion 117 that is radially inward of the bearing spacers. Optionally, at least one opening 111, and preferably two to four openings, are formed in the wall of bearing spacer 110. Openings 111 preferably are round holes, as shown, or alternatively may take other shapes. In addition, openings 111 preferably are formed at or near the longitudinal midpoint of beating spacer 110. Openings 111 enable the lubricant that is introduced into cavity 116 to pass from radially outward portion 115 of the cavity to radially inward portion 117.

More particularly, bearing spacer 110 maintains a proper, tight fit between inboard and outboard bearings 104, 106, while openings 111 allow lubricant to be distributed throughout cavity 116. In this manner, the bearing lubricant enters radially inward portion 117 of cavity 116 to wet the interface between the bearing cones of inboard and outboard bearings 104, 106, respectively, and axle spindle 100. With such wetting, the inner diameter surface of each bearing 104, 106 and the corresponding contact area on axle spindle 100 are lubricated, and therefore resist fretting, thereby facilitating relatively easy removal of hub 118 from the axle spindle for servicing, and also increasing the life of the axle spindle. More particularly, by reducing fretting, bearing spacer 110 makes it possible to more easily remove hub 118 after extensive miles of service, and allows for the hub to be rebuilt with new bearings 104, 106 and new seals such as main seal 126, and reinstalled on original spindle 100. Such rebuilding, as opposed to replacement, may result in significant cost savings to vehicle owners/operators.

The present invention also includes a method for selectively accommodating a conventional dual-wheel, standard-tire configuration and a single-wheel, wide-tire configuration on an axle spindle and a heavy-duty wheel end assembly in an economical and lightweight manner without substantial modifications to the frame, subframe, axle and/or suspension assemblies of the heavy-duty vehicle. The method includes steps in accordance with the description that is presented above and shown in FIGS. 4-6.

It is understood that the present invention has been described with reference to a specific embodiment, and that this description and illustration is by way of example and not by way of limitation. Potential modifications and alterations will occur to others upon a reading and understanding of this disclosure, and it is understood that the invention includes all such modifications and alterations and equivalents thereof.

Accordingly, the axle spindle and wheel end assembly of the present invention is simplified, provides an effective, safe, inexpensive, and efficient structure which achieves all the enumerated objectives, provides for eliminating difficulties encountered with prior-art axle spindles and wheel end assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved axle spindle and wheel end assembly are constructed, arranged and used, the characteristics of the construction and arrangement, and the advantageous, new and useful results obtained; the new and useful steps, structures, devices, elements, arrangements, parts and combinations, are set forth in the appended claims.

What is claimed is:

1. An axle spindle and a wheel end assembly combination for a heavy-duty vehicle, said heavy-duty vehicle including an axle having a central portion and a pair of said axle spindles, said axle central portion having a pair of ends and each one of said pair of axle spindles being connected to a respective one of said central portion ends, the heavy-duty vehicle further including a pair of said wheel end assemblies, each one of said pair of wheel end assemblies being rotatably mounted on a respective one of said axle spindles, each one of said axle spindle and wheel end assembly combination comprising:

an inboard bearing immovably mounted on said axle spindle;

an outboard bearing immovably mounted on said axle spindle outboardly of said inboard bearing and spaced apart from the inboard bearing, and said inboard and outboard bearings including respective inner diameters of generally the same size, wherein the ratio between the distance from the inboard surface of the inboard bearing to the outboard surface of the outboard bearing and the maximum outer diameter of said axle spindle at said inboard and outboard bearings is in a range of from about 1.15 to about 1.75; and a wheel hub rotatably mounted on said inboard and said outboard bearings, whereby said wheel end assembly selectively accommodates a dual-wheel, standard-tire configuration and a single-wheel, wide-tire configuration, including a wheel having a two-inch offset for said single-wheel, wide-tire configuration.

2. The axle spindle and wheel end assembly combination for a heavy-duty vehicle of claim 1, wherein said ratio is based upon a value of about 90 millimeters for said maximum outer diameter of said axle spindle at said inboard and outboard bearings.

3. The axle spindle and wheel end assembly combination for a heavy-duty vehicle of claim 1, in which the ratio between the distance from the inboard surface of said inboard bearing to the outboard surface of said outboard bearing and the maximum outer diameter of said axle spindle at said inboard and outboard bearings is in a range of from about 1.30 to about 1.60.

4. The axle spindle and wheel end assembly combination for a heavy-duty vehicle of claim 3, wherein said ratio is based upon a value of about 90 millimeters for said maximum outer diameter of said axle spindle at said inboard and outboard bearings.

5. The axle spindle and wheel end assembly combination for a heavy-duty vehicle of claim 3, in which the ratio between the distance from the inboard surface of said inboard bearing to the outboard surface of said outboard bearing and the maximum outer diameter of said axle spindle at said inboard and outboard bearings is in a range of from about 1.39 to about 1.50.

6. The axle spindle and wheel end assembly combination for a heavy-duty vehicle of claim 5, wherein said ratio is based upon a value of about 90 millimeters for said maximum outer diameter of said axle spindle at said inboard and outboard bearings.

7. The axle spindle and wheel end assembly combination for a heavy-duty vehicle of claim 1, in which the axial distance from the inboard surface of said inboard bearing to a wheel mounting face formed on said wheel hub is from about 1.20 inches to about 1.70 inches.

8. The axle spindle and wheel end assembly combination for a heavy-duty vehicle of claim 7, in which the axial distance from the inboard surface of said inboard bearing to a wheel mounting face formed on said wheel hub is about 1.55 inches.

9. The axle spindle and wheel end assembly combination for a heavy-duty vehicle of claim 1, in which a spacer is disposed between said inboard and said outboard bearings.

10. An axle spindle and a wheel end assembly combination for a heavy-duty vehicle, said heavy-duty vehicle including an axle having a central portion and a pair of said axle spindles, said axle central portion having a pair of ends and each one of said pair of axle spindles being connected to a respective one of said central portion ends, the heavy-duty vehicle further including a pair of said wheel end assemblies, each one of said pair of wheel end assemblies being rotatably mounted on a respective one of said axle spindles, each one of said axle spindle and wheel end assembly combination comprising:

an inboard bearing immovably mounted on said axle spindle;

an outboard bearing immovably mounted on said axle spindle outboardly of said inboard bearing;

a bearing spacer disposed between said inboard and outboard bearings, said bearing spacer having an outer diameter and an axial length, wherein a ratio of said axial length to said outer diameter is in a range of from about 0.20 to about 0.75; and a wheel hub rotatably mounted on said inboard and said outboard bearings, whereby said wheel end assembly selectively accommodates a dual-wheel, standard-tire configuration and a single-wheel, wide-tire configuration, including a wheel having a two-inch offset for said single-wheel, wide-tire configuration.

11. The axle spindle and wheel end assembly combination for a heavy-duty vehicle of claim 10, in which said ratio of said bearing spacer axial length to said bearing spacer outer diameter is in a range of from about 0.30 to about 0.75.

12. The axle spindle and wheel end assembly combination for a heavy-duty vehicle of claim 11, in which said ratio of said bearing spacer axial length to said bearing spacer outer diameter is in a range of from about 0.45 to about 0.60.

13. The axle spindle and wheel end assembly combination for a heavy-duty vehicle of claim 10, in which said wheel hub is formed with a cavity having a first portion located radially outwardly of said bearing spacer and a second portion located radially inwardly of the bearing spacer, and the bearing spacer is formed with at least one opening for enabling lubricant to pass from said first cavity portion to said second cavity portion.

* * * * *